United States Patent
Longley et al.

(10) Patent No.: US 10,546,045 B2
(45) Date of Patent: Jan. 28, 2020

(54) EFFICIENT EXTENDED-PRECISION PROCESSING

(71) Applicant: TEXAS INSTRUMENTS INCORPORATED, Dallas, TX (US)

(72) Inventors: Lester Anderson Longley, Atlanta, GA (US); Misael Lopez Cruz, Allen, TX (US); Victor Cheng, Fort Lauderdale, FL (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 55 days.

(21) Appl. No.: 15/847,440

(22) Filed: Dec. 19, 2017

(65) Prior Publication Data

US 2018/0322095 A1 Nov. 8, 2018

Related U.S. Application Data

(60) Provisional application No. 62/503,055, filed on May 8, 2017.

(51) Int. Cl.
*G06F 17/16* (2006.01)
*G06F 7/544* (2006.01)

(52) U.S. Cl.
CPC .......... *G06F 17/16* (2013.01); *G06F 7/5443* (2013.01)

(58) Field of Classification Search
None
See application file for complete search history.

(56) References Cited

U.S. PATENT DOCUMENTS

| | | | |
|---|---|---|---|
| 10,255,041 B2* | 4/2019 | Rarick | G06F 7/487 |
| 2006/0253519 A1* | 11/2006 | Tran | G06F 7/5318 708/523 |
| 2016/0188295 A1* | 6/2016 | Rarick | G06F 7/487 |

* cited by examiner

*Primary Examiner* — Michael D. Yaary
(74) *Attorney, Agent, or Firm* — Ebby Abraham; Charles A. Brill; Frank D. Cimino

(57) ABSTRACT

Systems and methods are provided for performing a dot product. Each of a first series of numbers is divided into a first value, comprising the N most significant bits of the number, and a second value to form first and second sets of values. Each of a second series of numbers is divided into a third value, comprising the N most significant bits of the number, and a fourth value to form third and fourth sets of values. A dot product of the first and fourth sets of values is computed to provide a first partial sum. A dot product of the first and third sets of values is computed to provide a second partial sum. A dot product of the second and third sets of values is computed to provide a third partial sum. The partial sums are summed to provide a result for the dot product.

20 Claims, 4 Drawing Sheets

EFFICIENT EXTENDED-PRECISION PROCESSING

RELATED APPLICATIONS

This application claims priority from U.S. Patent Application Ser. No. 62/503,055, filed 8 May 2017, which is incorporated herein in its entirety.

TECHNICAL FIELD

This invention relates to computer processing, and more particularly, to efficient calculation of an extended-precision vector dot product across two series of numbers.

BACKGROUND

A computer number format is the internal representation of numeric values in digital computer and calculator hardware and software. Normally, numeric values are stored as groupings of bits, named for the number of bits that compose them. The encoding between numerical values and bit patterns is chosen for convenience of the operation of the computer. Different types of processors may have different internal representations of numerical values. Different conventions are used for integer and real numbers. Most calculations are carried out with number formats that fit into a processor register, but some software systems allow representation of arbitrarily large numbers using multiple words of memory. The term "precision" refers both to the number of bits used to represent a value, particularly a non-integer value, and a number of bits available in a processor register.

SUMMARY OF THE INVENTION

In accordance with an example of the present invention, a method is provided for performing a dot product between a first series of numbers and a second series of numbers at a processing unit. Each of the first series of numbers is divided into a first value, comprising the N most significant bits of the number, where N is an integer greater than two, and a second value, comprising a plurality of less significant bits of the number, to form a first set of values, comprising the first values across the first series of numbers, and a second set of values, comprising the second values across the first series of numbers. Each of the second series of numbers is divided into a third value, comprising the N most significant bits of the number, and a fourth value, comprising a plurality of less significant bits of the number, to form a third set of values, comprising the third values across the second series of numbers, and a fourth set of values, comprising the fourth values across the second series of numbers. A dot product of the first set of values and the fourth set of values is computed to provide a first partial sum. A dot product of the first set of values and the third set of values is computed to provide a second partial sum. A dot product of the second set of values and the third set of values is computed to provide a third partial sum. The first partial sum, the second partial sum, and the third partial sum are summed to provide a result for the dot product between the first series of numbers and the second series of numbers.

In accordance with another example of the present invention, a system includes a processor and a non-transitory computer readable medium storing machine executable instructions for performing a dot product between a first series of numbers, and a second series of numbers. The instructions include a segmentation engine that divides each of the first series of numbers into a first value, comprising the N most significant bits of the number, where N is an integer greater than two, and a second value, comprising a plurality of less significant bits of the number, to form a first set of values, comprising the first values across the first series of numbers, and a second set of values, comprising the second values across the first series of numbers. The segmentation engine further divides each of the second series of numbers into a first value, comprising the N most significant bits of the number, and a second value, comprising a plurality of less significant bits of the number, to form a third set of values, comprising the first values across the second series of numbers, and a fourth set of values, comprising the second values across the second series of numbers.

A first multiply-accumulate (MAC) operation computes a dot product of the first set of values and the fourth set of values to provide a first partial sum. A second MAC operation computes a dot product of the first set of values and the third set of values to provide a second partial sum. A third MAC operation computes a dot product of the second set of values and the third set of values to provide a third partial sum. A summer sums the first partial sum, the second partial sum, and the third partial sum to provide a result for the dot product between the first series of numbers and the second series of numbers In accordance with yet another example of the present invention, a non-transitory computer readable medium stores machine readable instructions executable by an associated processor to perform a method for performing a dot product between a first series of numbers, and a second series of numbers. The method includes dividing each of the first series of numbers into a first value, comprising the N most significant bits of the number, where N is an integer greater than two that is determined according to a native resolution of the processor, and a second value, comprising a plurality of less significant bits of the number, to form a first set of values, comprising the first values across the first series of numbers, and a second set of values, comprising the second values across the first series of numbers. Each of the second series of numbers are divided into a third value, comprising the N most significant bits of the number, and a fourth value, comprising a plurality of less significant bits of the number, to form a third set of values, comprising the third values across the second series of numbers, and a fourth set of values, comprising the fourth values across the second series of numbers.

A dot product of the first set of values and the fourth set of values is computed to provide a first partial sum. A dot product of the first set of values and the third set of values is computed to provide a second partial sum. A dot product of the second set of values and the third set of values is computed to provide a third partial sum. The first partial sum, the second partial sum, and the third partial sum are summed to provide a result for the dot product between the first series of numbers and the second series of numbers.

DETAILED DESCRIPTION OF THE INVENTION

Figure 1:
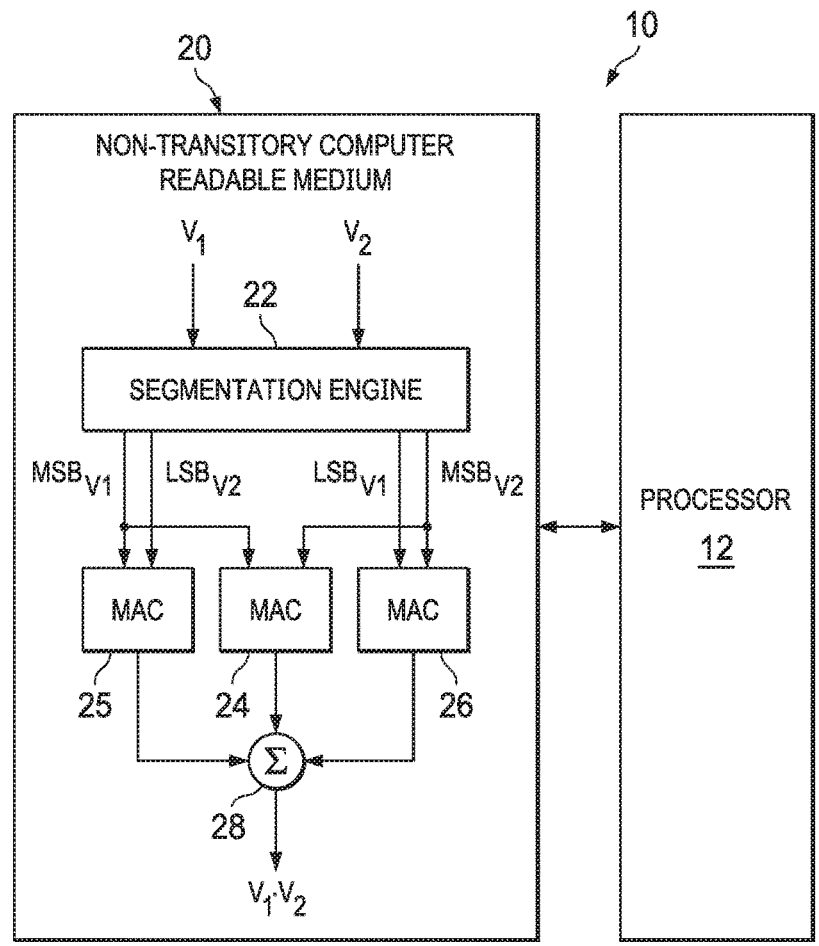
FIG. 1 illustrates a system for performing a dot product between two series of numbers.

FIG. 1 illustrates a system 10 for performing a dot product between two series of numbers. For the purposes of this application, a "dot product" may refer to the result of the sum of the products of a series of multiplications of corresponding values within two series of numbers. For example, a dot product between the series [1, 3, 5] and the series [2, 4, 6] would be equal to [(1*2)+(3*4)+(5*6)]=44. The system 10 includes a processor 12 and a non-transitory computer readable medium 20 storing machine executable instructions for performing a dot product between a first series of numbers, and a second series of numbers. In one implementation, the system 10 can implement an audio filtering system, in which the first series of numbers represent audio inputs, and the second series of numbers represent filter coefficients.

The machine executable instructions include a segmentation engine 22 that divides each of the first series of numbers into a first value, comprising the N most significant bits of the number, where N is an integer greater than two, and a second value, comprising a plurality of less significant bits of the number. In general, the plurality of less significant bits will include a number of bits less than or equal to N. It will be appreciated that the second value does not necessarily represent the least significant bits of the number, but can instead, for example, represent N less significant bits of the number after the N most significant bits. In one implementation, N can be selected according to a native precision of the processor 12, such that later operations, such as the multiple-accumulate operations at 24-26, can be performed at the native precision.

From these values, the segmentation engine 22 generates a first set of values, comprising all of the first values segmented from the first series of numbers, and a second set of values, comprising all of the second values segmented from the first series of numbers. The segmentation engine 22 also divides each of the second series of numbers into a third value, comprising the N most significant bits of the number, and a fourth value, comprising a plurality of less significant bits of the number. From these values, the segmentation engine 22 generates a third set of values, comprising all of the third values segmented from the second series of numbers, and a fourth set of values, comprising all of the fourth values segmented from the second series of numbers.

A first multiply-accumulate (MAC) operation 24 computes a dot product of the first set of values and the third set of values to provide a first partial sum. It will be appreciated that the first partial sum represents the sum of the products of the most significant bits of the corresponding numbers of the two series of numbers. A second MAC operation 25 computes a dot product of the first set of values and the fourth set of values to provide a second partial sum, representing the sum of the products of the most significant bits of each of the first series of numbers with the set of less significant bits from the corresponding number of the second series of numbers. A third MAC operation 26 that computes a dot product of the second set of values and the third set of values to provide a third partial sum, representing the sum of the products of the most significant bits of each of the second series of numbers with the set of less significant bits from the corresponding number of the first series of numbers.

In one implementation, the first MAC operation 24, the second MAC operation 25, and the third MAC operation 26 operate in parallel and are performed substantially simultaneously. In one example, each of the first series of numbers and the second series of numbers contain M values, where M is an integer less than 257, and each of the first partial sum, the second partial sum, and the third partial sum are represented as a value stored as at least 2N+8 bits. For example, the processor can have a native resolution of sixteen bits, N can be equal to sixteen, and each of the first partial sum, the second partial sum, and the third partial sum are represented as a value stored as at least forty bits.

A summer 28 sums the first partial sum, the second partial sum, and the third partial sum to provide a result for the dot product between the first series of numbers and the second series of numbers. It will be appreciated that, given the omission of any dot product of the second set of values and the fourth set of values, as well as the possible omission of one or more least significant bits during the segmentation, the resulting sum may only represent the dot product to a degree of precision less than 2N. To the extent that greater precision is required, a fourth MAC operation (not shown) can be included to compute a dot product of the second set of values and the fourth set of values to provide a fourth partial sum. In this case, the summer 28 can sum the first partial sum, the second partial sum, the third partial sum, and the fourth partial sum to provide the result of the dot product with full precision.

It will further be appreciated that the first series of numbers and the second series of numbers can be segmented into more than two values. For example, in one implementation, the segmentation engine 22 divides each of the first series of numbers into three values, a first value representing N most significant bits, a second value representing the N less significant bits, and a plurality of least significant bits of the number, to form the first set of values, the second set of values, and a fifth set of values, comprising the least significant bits of each number of the first series of numbers. In this implementation, the segmentation engine 22 also divides each of the second series of numbers into three values, a first value representing N most significant bits, a second value representing the N less significant bits, and a plurality of least significant bits of the number, to form the third set of values, the fourth set of values, and a sixth set of values, comprising the least significant bits of each number of the second series of numbers.

Continuing this implementation, the system 10 can further include a fourth MAC operation (not shown) that computes a dot product of the second set of values and the fourth set of values to provide a fourth partial sum, a fifth MAC operation (not shown) that computes a dot product of the first set of values and the sixth set of values to provide a fifth partial sum, and a sixth MAC operation (not shown) that computes a dot product of the second set of values and the fifth set of values to provide a fifth partial sum. The summer 28 sums the first partial sum, the second partial sum, the third partial sum, the fourth partial sum, the fifth partial sum, and the sixth partial sum to provide the result for the dot product between the first series of numbers and the second series of numbers. It will be appreciated that further partial sums can be computed from the sets of values representing the less significant and least significant bits of the values to increase the resolution of the resulting dot product.

Figure 2:
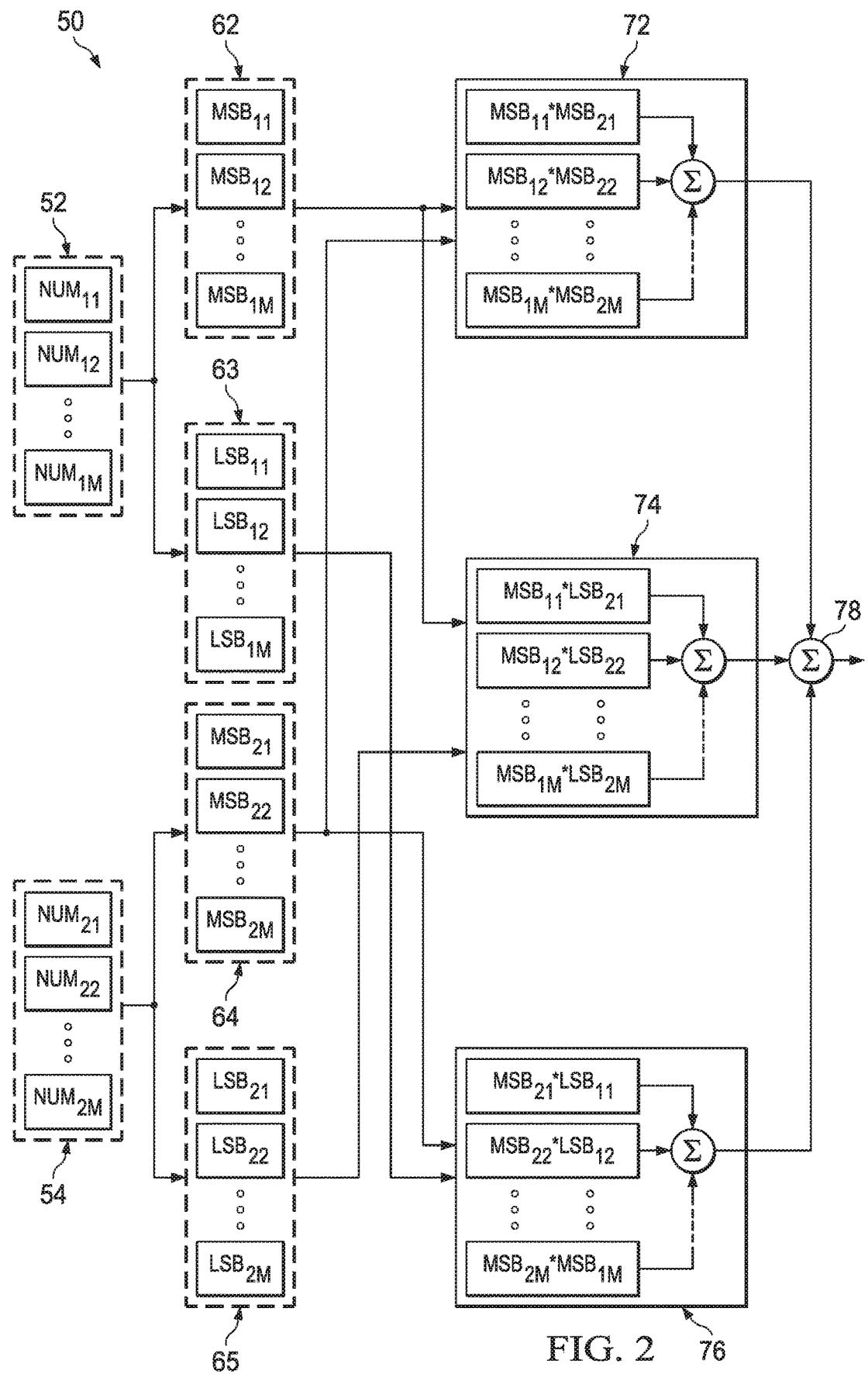
FIG. 2 illustrates a schematic representation of one example of a calculation of a dot product between two series of numbers.

FIG. 2 illustrates a schematic representation 50 of one example of a calculation of a dot product between two series of numbers 52 and 54. In the illustrated representation, each of the two series of numbers contains M numbers, where M is an integer. In this representation, the first series of numbers 52 is separated into two sets of M values, a first set of values 62 containing the N most significant bits of each number in the first series of numbers and a second set of values 63 containing the remaining bits in each number. In this representation, the second series of numbers 54 is separated into two sets of M values, a third set of values 64 containing the N most significant bits of each number in the second series of numbers and a fourth set of values 65 containing the remaining bits in each number. To simplify the example, it is assumed that each number in each series of numbers 52 and 54 is represented by a value with less than or equal to 2N bits, although it will be appreciated that values represented with higher precision can be accommodated, for example, by omitting some of the less significant bits of each number or by splitting the series of numbers into more than two sets of values.

Partial sums for the dot product are calculated at each of three multiply and accumulate (MAC) operations 72, 74, and 76. Specifically, the first MAC operation 72 multiplies each value ($MSB_{1i}$) of the first set of values with the corresponding value ($MSB_{2i}$) of the third set of values and sums the resulting products to provide a first partial sum. The second MAC operation 74 multiplies each value ($MSB_{1i}$) of the first set of values with the corresponding value ($LSB_{2i}$) of the fourth set of values and sums the resulting products to provide a second partial sum. The third MAC operation 76 multiplies each value ($MSB_{2i}$) of the third set of values with the corresponding value ($LSB_{1i}$) of the second set of values and sums the resulting products to provide a third partial sum. The first, second, and third partial sums are summed at a summer 78 to provide a result for the dot product operation. Since the first, second, third, and fourth 62-65 sets of values are limited to N bits, for a processor with a native resolution of N bits, each multiple and accumulate operation 72, 74, 76 can thus be performed at their native resolution, as opposed to a less efficient extended precision operation. This allows for the dot product to be completed more efficiently with minimal, if any, sacrifice of precision in the final dot product result.

Figure 3:
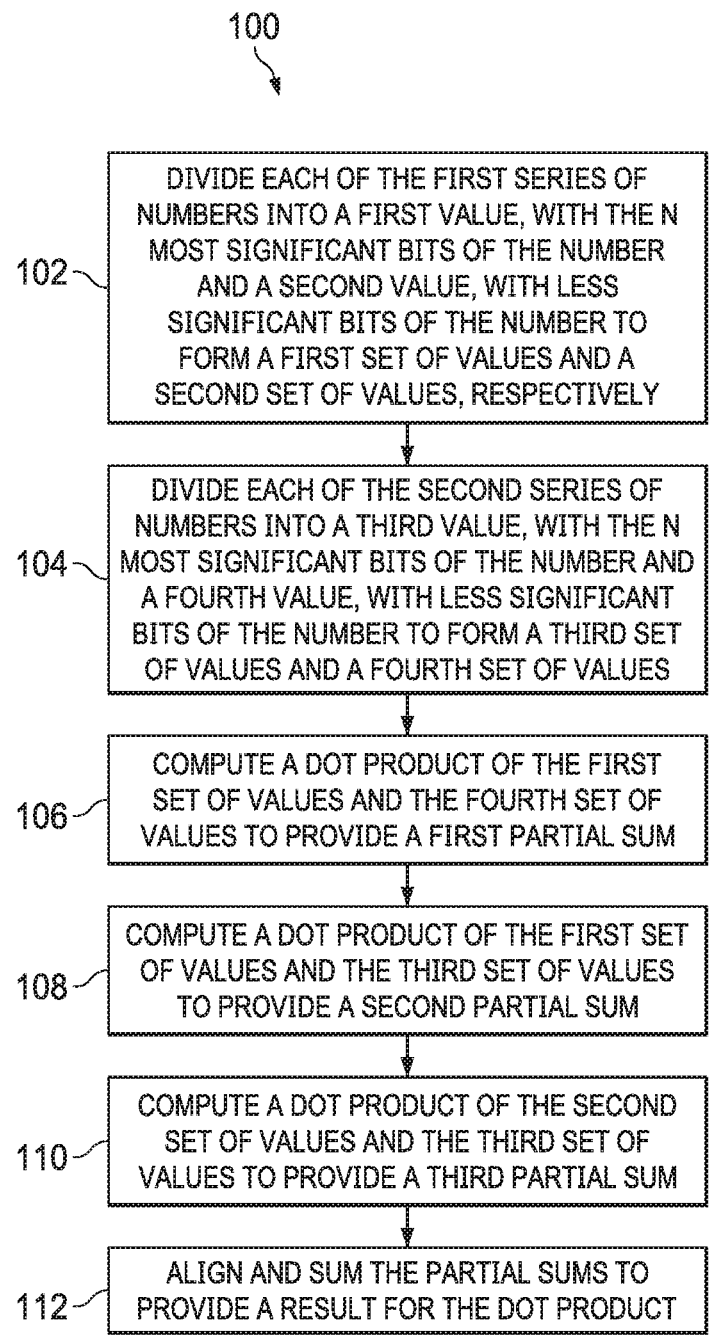
FIG. 3 illustrates one example of a method for performing a dot product between a first series of numbers, and a second series of numbers.
Figure 4:
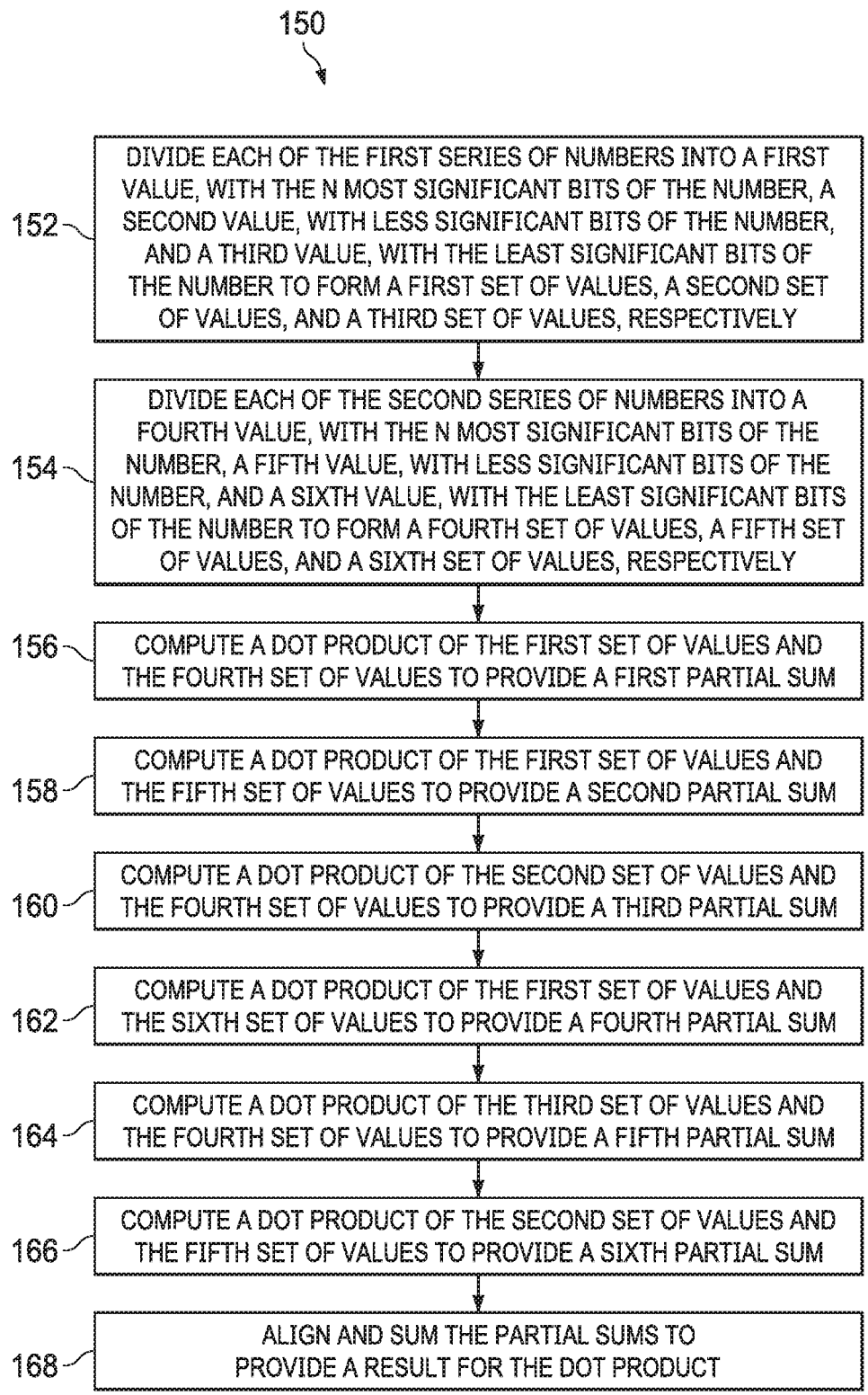
FIG. 4 illustrates another example of a method for performing a dot product between a first series of numbers, and a second series of numbers.

In view of the foregoing structural and functional features described above, methods in accordance with various examples of the present invention will be better appreciated with reference to FIGS. 3 and 4. While, for purposes of simplicity of explanation, the methods of FIGS. 3 and 4 are shown and described as executing serially, it is to be understood and appreciated that the present invention is not limited by the illustrated order, as some examples could, in accordance with the present invention, occur in different orders and/or concurrently with other examples from that shown and described herein. Moreover, not all illustrated features may be required to implement a method in accordance with an example of the present invention.

FIG. 3 illustrates one example of a method 100 for performing a dot product between a first series of numbers, and a second series of numbers. At 102, each of the first series of numbers is divided into a first value, comprising the N most significant bits of the number, where N is an integer greater than two, and a second value, comprising a plurality of less significant bits of the number, to form a first set of values, comprising the first values across the first series of numbers, and a second set of values, comprising the second values across the first series of numbers. At 104, each of the second series of numbers is divided into a third value, comprising the N most significant bits of the number, and a fourth value, comprising a plurality of less significant bits of the number, to form a third set of values, comprising the third values across the second series of numbers, and a fourth set of values, comprising the fourth values across the second series of numbers. In one implementation, N is selected to be equal to a native precision for a multiply-accumulate operation of a processing unit performing the dot product.

At 106, a dot product of the first set of values and the fourth set of values is computed to provide a first partial sum. At 108, a dot product of the first set of values and the third set of values is computed to provide a second partial sum. At 110, a dot product of the second set of values and the third set of values to provide a third partial sum. At 112, the first partial sum, the second partial sum, and the third partial sum are summed to provide a result for the dot product between the first series of numbers and the second series of numbers. It will be appreciated that each of steps 106, 108, and 110 can be performed in parallel at the processing unit. In one implementation, the first series of numbers and the second series of numbers contain M values, where M is an integer less than 257, and each of the first partial sum, the second partial sum, and the third partial sum is represented as a value having 2N+8 bits.

FIG. 4 illustrates another example of a method 150 for performing a dot product between a first series of numbers, and a second series of numbers. At 152, each of the first series of numbers is divided into a first value, comprising the N most significant bits of the number, where N is an integer greater than two, a second value, comprising a plurality of less significant bits of the number, and a third value, comprising a plurality of least significant bits of the number, to form a first set of values, comprising the first values across the first series of numbers, a second set of values, comprising the second values across the first series of numbers, and a third set of values, comprising the third values across the first series of numbers. In general, the number of bits in the second and third values will be less than N. At 154, each of the second series of numbers is divided into a fourth value, comprising the N most significant bits of the number, a fifth value, comprising a plurality of less significant bits of the number, and a sixth value, comprising a plurality of least significant bits of the number, to form a fourth set of values, comprising the fourth values across the second series of numbers, a fifth set of values, comprising the fifth values across the second series of numbers, and a sixth set of values, comprising the sixth values across the second series of numbers. In general, the number of bits in the fifth and sixth values will be less than N.

At 156, a dot product of the first set of values and the fourth set of values is computed to provide a first partial sum. At 158, a dot product of the first set of values and the fifth set of values is computed to provide a second partial sum. At 160, a dot product of the fourth set of values and the second set of values to provide a third partial sum. At 162, a dot product of the first set of values and the sixth set of values is computed to provide a fourth partial sum. At 164, a dot product of the fourth set of values and the third set of values is computed to provide a fifth partial sum. At 166, a dot product of the second set of values and the fifth set of values to provide a sixth partial sum. At 168, the six partial sums are summed to provide a result for the dot product between the first series of numbers and the second series of numbers. It will be appreciated that further partial sums can be computed from the sets of values representing the less significant and least significant bits of the values to increase the resolution of the resulting dot product.

Figure 5:
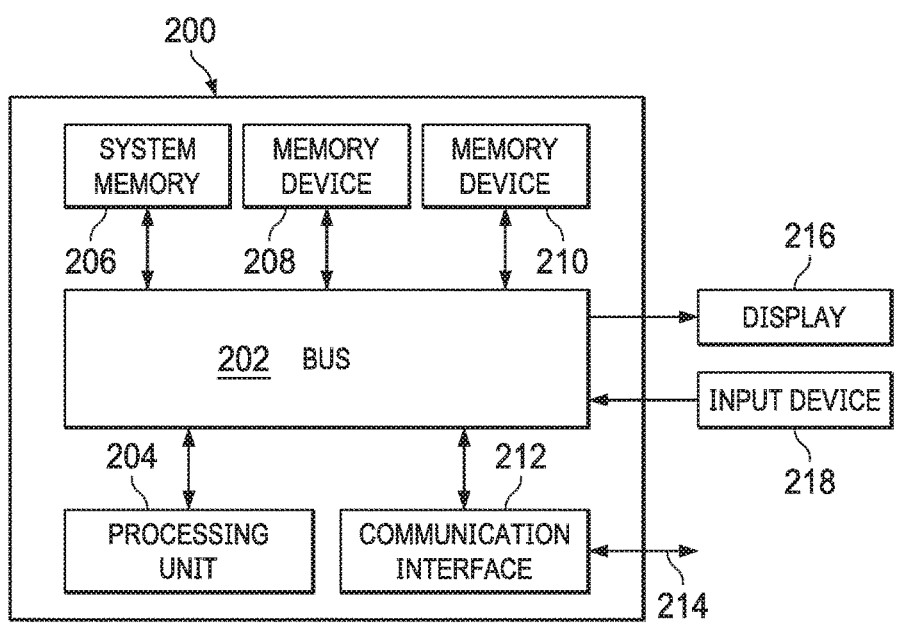
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 200 of hardware components capable of implementing examples of the systems and methods disclosed in FIGS. 1-4. The system 200 can include various systems and subsystems. The system 200 can be a personal computer, an embedded processor, a microprocessor, a digital signal processor, a laptop computer, a workstation, a computer system, an appliance, an application-specific integrated circuit (ASIC), a server, a server blade center, a server farm, etc.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand-alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a dot product operation in accordance with the present invention. Computer executable logic for implementing the dot product operation resides on one or more of the system memory 206, and the memory devices 208, 210 in accordance with certain examples, and in one implementation is part of a function library associated with system 200. The processing unit 204 executes one or more computer executable instructions originating from the system memory 206 and the memory devices 208 and 210. The term "computer readable medium" as used herein refers to a medium that participates in providing instructions to the processing unit 204 for execution.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for performing a dot product between a first series of numbers and a second series of numbers at a processing unit comprising:
   dividing each of the first series of numbers into a first value, comprising the N most significant bits of the number, where N is an integer greater than two, and a second value, comprising a plurality of less significant bits of the number, to form a first set of values, comprising the first values across the first series of numbers, and a second set of values, comprising the second values across the first series of numbers;
   dividing each of the second series of numbers into a third value, comprising the N most significant bits of the number, and a fourth value, comprising a plurality of less significant bits of the number, to form a third set of values, comprising the third values across the second series of numbers, and a fourth set of values, comprising the fourth values across the second series of numbers;
   computing a dot product of the first set of values and the fourth set of values to provide a first partial sum;
   computing a dot product of the first set of values and the third set of values to provide a second partial sum;
   computing a dot product of the second set of values and the third set of values to provide a third partial sum; and
   summing the first partial sum, the second partial sum, and the third partial sum to provide a result for the dot product between the first series of numbers and the second series of numbers,
   wherein a number of bits in individual numbers of the first series of numbers or a number of bits in individual numbers of the second series of numbers is greater than a number of bits of a native precision of the processing unit, and
   wherein N is selected such that the computing actions and the summing action can be performed within the native precision of the processing unit.

2. The method of claim 1, further comprising computing a dot product of the second set of values and the fourth set of values to provide a fourth partial sum, wherein summing the first partial sum, the second partial sum, and the third partial sum to provide the result for the dot product between the first series of numbers and the second series of numbers comprises summing the first partial sum, the second partial sum, the third partial sum, and the fourth partial sum.

3. The method of claim 1, wherein dividing each of the first series of numbers comprises dividing each of the first series of numbers into the first value, the second value, and a fifth value, comprising a plurality of least significant bits of the number, to form the first set of values, the second set of values, and a fifth set of values, comprising the fifth values across the first series of numbers.

4. The method of claim 1, wherein each of the first series of numbers and the second series of numbers contain M values, where M is an integer less than 257, and each of the first partial sum, the second partial sum, and the third partial sum are represented as a value having 2N+8 bits.

5. The method of claim 1, wherein N is selected to be equal to a native precision for a multiply-accumulate operation of the processing unit.

6. The method of claim 1, wherein the steps of computing the dot product of the first set of values and the second set of values to provide the first partial sum and computing the dot product of the first set of values and the third set of values to provide the second partial sum are performed in parallel at the processing unit.

7. A system comprising:
a memory; and
one or more processors coupled to the memory, and configured to:
divide each of a first series of numbers into a first value, comprising the N most significant bits of the number, where N is an integer greater than two, and a second value, comprising a plurality of less significant bits of the number, to form a first set of values, comprising the first values across the first series of numbers, and a second set of values, comprising the second values across the first series of numbers;
divide each of a second series of numbers into a first value, comprising the N most significant bits of the number, and a second value, comprising a plurality of less significant bits of the number, to form a third set of values, comprising the first values across the second series of numbers, and a fourth set of values, comprising the second values across the second series of numbers;
compute a first dot product of the first set of values and the fourth set of values to provide a first partial sum;
compute a second dot product of the first set of values and the third set of values to provide a second partial sum;
compute a third dot product of the second set of values and the third set of values to provide a third partial sum; and
sum the first partial sum, the second partial sum, and the third partial sum to provide a result for the dot product between the first series of numbers and the second series of numbers,
wherein a number of bits in individual numbers of the first series of numbers or a number of bits in individual numbers of the second series of numbers is greater than a number of bits of a native precision of the processors, and
wherein N is selected such that the compute actions and the sum action can be performed within the native precision of the processors.

8. The system of claim 7, wherein the one or more processors are further configured to compute a dot product of the second set of values and the fourth set of values to provide a fourth partial sum, sum the first partial sum, the second partial sum, the third partial sum, and the fourth partial sum to provide the result for the dot product between the first series of numbers and the second series of numbers.

9. The system of claim 7, wherein the one or more processors are further configured to divide each of the first series of numbers into the first value, the second value, and a fifth value, comprising a plurality of least significant bits of the number, to form the first set of values, the second set of values, and a fifth set of values, comprising the fifth values across the first series of numbers and divides each of the second series of numbers into the third value, the fourth value, and a sixth value, comprising a plurality of least significant bits of the number, to form the third set of values, the fourth set of values, and a sixth set of values, comprising the sixth values across the second series of numbers.

10. The system of claim 9, wherein the one or more processors are further configured to:

compute a dot product of the second set of values and the fourth set of values to provide a fourth partial sum;
compute a dot product of the first set of values and the sixth set of values to provide a fifth partial sum; and
compute a dot product of the second set of values and the fifth set of values to provide a sixth partial sum;
sum the first partial sum, the second partial sum, the third partial sum, the fourth partial sum, the fifth partial sum, and the sixth partial sum to provide the result for the dot product between the first series of numbers and the second series of numbers.

11. The system of claim 7, wherein each of the first series of numbers and the second series of numbers contain M values, where M is an integer less than 257, and each of the first partial sum, the second partial sum, and the third partial sum are represented as a value stored as at least 2N+8 bits.

12. The system of claim 7, wherein N is selected according to a native precision of the one or more processors.

13. The system of claim 12, wherein the one or more processors have a native resolution of sixteen bits, N is equal to sixteen, and each of the first partial sum, the second partial sum, and the third partial sum are represented as a value stored as at least forty bits.

14. The system of claim 7, wherein the one or more processors are configured to calculate the first, second, and third dot products in parallel and substantially simultaneously.

15. A non-transitory computer readable medium storing machine readable instructions, that when executed by a processor, cause one or more processors to:
divide each of a first series of numbers into a first value, comprising the N most significant bits of the number, where N is an integer greater than two that is determined according to a native resolution of the processor, and a second value, comprising a plurality of less significant bits of the number, to form a first set of values, comprising the first values across the first series of numbers, and a second set of values, comprising the second values across the first series of numbers;
divide each of a second series of numbers into a third value, comprising the N most significant bits of the number, and a fourth value, comprising a plurality of less significant bits of the number, to form a third set of values, comprising the third values across the second series of numbers, and a fourth set of values, comprising the fourth values across the second series of numbers;
compute a dot product of the first set of values and the fourth set of values to provide a first partial sum;
compute a dot product of the first set of values and the third set of values to provide a second partial sum;
compute a dot product of the second set of values and the third set of values to provide a third partial sum; and
sum the first partial sum, the second partial sum, and the third partial sum to provide a result for the dot product between the first series of numbers and the second series of numbers,
wherein a number of bits in individual numbers of the first series of numbers or a number of bits in individual numbers of the second series of numbers is greater than a number of bits of a native precision of the processor, and
wherein N is selected such that the compute actions and the sum action can be performed within the native precision of the processor.

16. The non-transitory computer readable medium of claim 15, wherein the instructions further cause the one or more processors to compute a dot product of the second set of values and the fourth set of values to provide a fourth partial sum, wherein the instructions that cause the one or more processors to sum the first partial sum, the second partial sum, and the third partial sum include instructions that cause the one or more processors to sum the first partial sum, the second partial sum, the third partial sum, and the fourth partial sum.

17. The non-transitory computer readable medium of claim 15, wherein the instructions that cause the one or more processors to divide each of the first series of numbers include instructions that cause the one or more processors to divide each of the first series of numbers into the first value, the second value, and a fifth value, comprising a plurality of least significant bits of the number, to form the first set of values, the second set of values, and a fifth set of values, comprising the fifth values across the first series of numbers.

18. The non-transitory computer readable medium of claim 15, wherein each of the first series of numbers and the second series of numbers contains M values, where M is an integer less than 257, and each of the first partial sum, the second partial sum, and the third partial sum are represented as a value having 2N+8 bits.

19. The non-transitory computer readable medium of claim 15, wherein the instructions that cause the one or more processors to compute the dot product of the first set of values and the second set of values to provide the first partial sum and compute the dot product of the first set of values and the third set of values to provide the second partial sum are performed in parallel at the one or more processors.

20. The non-transitory computer readable medium of claim 15, wherein the one or more processors have a native resolution of sixteen bits, N is equal to sixteen, and each of the first partial sum, the second partial sum, and the third partial sum are represented as a value stored as at least forty bits.

* * * * *